Dec. 14, 1937. V. GERSTENBERG 2,101,996
MANUFACTURE OF TABLE TOPS AND OTHER ARTICLES OF FURNITURE OR EQUIPMENT
Filed Nov. 5, 1935
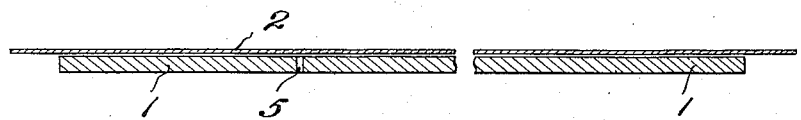
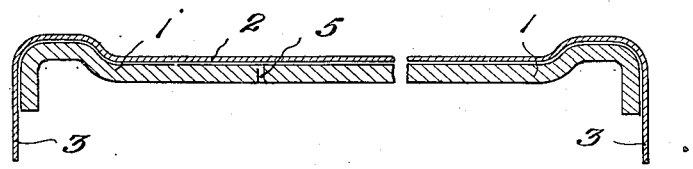
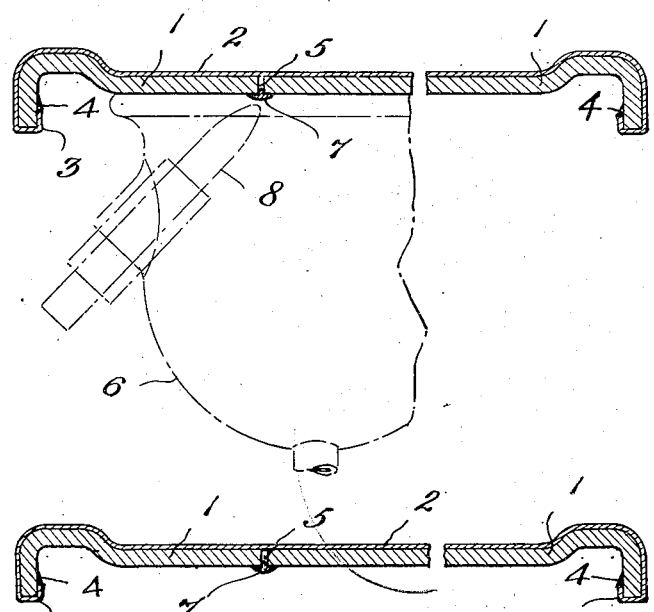
INVENTOR.
VIVIAN GERSTENBERG.
BY
ATTORNEY.

Patented Dec. 14, 1937

2,101,996

UNITED STATES PATENT OFFICE 2,101,996

MANUFACTURE OF TABLE TOPS AND OTHER ARTICLES OF FURNITURE OR EQUIPMENT

Vivian Gerstenberg, Birmingham, England, assignor to The International Nickel Company, Inc., New York, N. Y., a corporation of Delaware Application November 5, 1935, Serial No. 48,267
In Great Britain November 12, 1934

8 Claims. (Cl. 29—148)

The present invention relates to a method of securing a thin metal sheet to a rigid, non-porous base-plate, and more particularly to a method of making metal table tops and other articles of furniture or equipment having a composite metal structure constituted of a thin resilient sheet of corrosion-resistant metal or alloy and a heavy steel plate or the like.

Heretofore, it was frequently desired to provide corrosion-resistant metal surfaces to table tops, sink draining boards, and other articles, such as pieces of hospital and restaurant equipment, but relatively heavy sheets of corrosion-resistant metals such as "stainless" steel or the alloy sold under the trade-mark "Monel metal" have been comparatively expensive. Accordingly a very thin resilient sheet of the metal was frequently applied to a rigid base such as a steel plate. It was found, however, that in such a case there was a tendency for the metal sheet, especially when it possesses a resilient character, to bulge unless means were provided for securing the resilient sheet to the base over the whole of the interface surfaces. Although many attempts have been made to provide a composite structure without soldering the entire or part or regions of the underside of the resilient sheet to the upperside of the base, no simple method has been proposed which is wholly satisfactory, especially when carried into practice on an industrial scale.

It is an object of the present invention to provide a method of securing a thin metal sheet to a rigid, non-porous base plate with the aid of a vacuum for use in the manufacture of table tops and other articles of furniture or equipment.

It is a further object of the invention to provide a method of producing metal table tops and other composite structures constituted of a thin resilient sheet of corrosion resistant metal or alloy and a heavy steel plate or the like by sealing the periphery of the structure and by exhausting the air from the space between the thin sheet and the plate whereby the sheet and plate are brought into intimate contact with each other due to the force applied to the surface of the structure by the pressure of the atmosphere.

A further object of the invention is to provide a method for use in the manufacture of table tops and other articles of furniture or equipment involving the novel combination of operations of securing a thin metal sheet to a rigid, non-porous base plate by superimposing a relatively thin metal sheet upon a metal base plate provided with an opening or port for the exhaustion of air from the space between the sheet and the plate, securing the peripheral edges of the thin metal sheet to the base plate to form a seal, exhausting the air between the sheet and the plate via the exhaustion port to create a vacuum between the sheet and the plate and to cause the pressure of the atmosphere to bring the sheet and plate into intimate contact with each other, and then sealing the exhaustion port to preserve the vacuum between the sheet and the plate.

It is also within the contemplation of the invention to provide a method of manufacturing metal table tops and the like which involves superimposing a thin resilient sheet of corrosion metal or alloy upon a steel base plate having a smaller area than the sheet and being provided with an opening or port for exhausting air from the space between the underside of the sheet and the upperside of the plate, applying pressure to the sheet and the plate to bring them into intimate engagement with each other, deforming the sheet and plate to the shape desired in the finished table top or other article of manufacture, bending the peripheral edges of the sheet around the edge of the plate and uniting the peripheral edge of the sheet to said plate to form a seal, exhausting the air from the space of the underside of the metal sheet and the upperside of the plate via said exhausting port to produce a vacuum and to cause atmospheric pressure to force the metal sheet into intimate engagement with the base plate to give a smooth surface free from bulges, ripples and the like, and sealing said exhausting port to preserve the vacuum in said space.

Other objects and advantages will become apparent from the following description taken in conjunction with the accompanying drawing in which:

Fig. 1 illustrates a sectional view of a thin metal sheet superimposed upon a base plate provided with an exhausting port;

Fig. 2 is similar to Fig. 1 except that it shows the sheet and plate deformed to the shape desired in the finished table top or article of manufacture;

Fig. 3 is a sectional view, partly diagrammatic, depicting the table top or the like of Fig. 2 with the peripheral edge of the metal sheet sealed to the base plate and showing in dotted lines an exhaustion or vacuum bell and an electrically heating soldering iron arranged to exhaust the air within the space between the underside of the metal sheet and the upperside of the base plate and to seal the exhausting port with a bead of solder or the like; and Fig. 4 shows the finished metal table top or other article of manufacture.

It has been discovered that when a thin metal sheet is applied to a rigid metal base, the edges of the sheet are completely sealed to the base, and the air between the sheet and the base is exhausted, as a result of the exhaustion of air and the creation of a vacuum, the metal sheet is forced closely against the base by the external atmospheric pressure and there is no tendency for the metal sheet to lift from the base and bulge outwards. The base must be impervious and as a rule consists of metal, such as plate of mild steel. It may, however, consist of any other suitable material but if a porous material such as wood is used it should be impregnated to eliminate the porosity.

For the purpose of giving those skilled in the art a better understanding of carrying the present invention into practice, the manufacture of a table top having a corrosion resistant metal and a metal reinforcing plate will now be described in conjunction with the accompanying drawing.

The top is made from a mild steel reinforcing base 1, say 0.062" thick, and a thin sheet 2 of corrosion resistant alloy sold under the trade-mark "Monel metal", say 0.018" thick, and slightly larger than the table top to be manufactured. These two sheets are placed in contact with each other as illustrated in Fig. 1 and forced through a die with the sheet 2 leading, so as to stretch this sheet tightly over the base 1 and form the peripheral portion into a flange 3 projecting downwardly from the base 1 as shown in Fig. 2.

At this stage, there is an air-space between the base 1 and sheet 2. The flange 3 is next bent firmly around the edge of the base 1 and its edge is hermetically sealed with soft solder or other suitable material to the base 1 as shown at edge or junction 4. A small opening 5 is provided in the base before the sheet 2 is applied to the base, and a vacuum bell 6 containing a bead of solder 7 and an electrically heated soldering iron 8 is placed over the opening 5. The air between the base 1 and sheet 2 is exhausted through this bell and after the exhaustion, the opening 5 is soldered up within the bell, which is then removed. The resultant product is shown in Fig. 4 and it has been found that the sheet 1 is flush with the base 2 and that there is no tendency for any bulges to form in use.

The opening 5 is arranged at a convenient location close to the edge of the base 1. This position is preferred because if the opening is in the middle of the base there is a risk of the part of the sheet 1 that immediately surrounds the opening being immediately drawn into tight contact with the base and thus preventing the removal of air from the outer portion of the air space. This risk is avoided by placing the opening 5 close to one edge.

The present invention is not restricted to any particular method of exhausting the air. Thus, for example, a tube may be secured around or to the opening by welding, soldering or screwing or the like, and the air may be exhausted through this tube. The tube may afterwards be pinched to seal it or it may be sealed by solder or the like.

Although the present invention has been described in conjunction with a preferred embodiment, it is to be observed that the present invention is not limited thereto. Thus, any corrosion resistant metal or alloy may be used, such as sheets of nickel silver or "stainless" steel, or the like. Of course, sheet metal which is not corrosion-resistant, but which is desirable for other reasons, may be used.

I claim:

1. The method of producing articles of manufacture including table tops constituted of a thin metal sheet and a rigid, non-porous base plate which comprises superimposing a thin metal sheet upon a rigid, non-porous metal base plate provided with an exhausting port, sealing said metal sheet and plate solely in the neighborhood of the peripheral region thereof, exhausting the air in the space between the underside of the metal sheet and the upperside of the base plate whereby the metal sheet is forced into permanent intimate mechanical engagement with said base plate throughout practically the entire surface without the occurrence of open spaces by the pressure of the atmosphere without welding of the surface of said metal sheet to the surface of said base plate, and sealing said exhausting port.

2. The method of producing articles of manufacture including table tops constituted of a thin metal sheet and a rigid, non-porous base plate which comprises superimposing a thin metal sheet upon a rigid, non-porous metal base plate provided with an exhausting port, providing said exhausting port with a tube, sealing said metal sheet and plate solely in the neighborhood of the peripheral region thereof, exhausting the air in the space between the underside of the metal sheet and the upperside of the base plate whereby the metal sheet is forced into permanent intimate mechanical engagement with said base plate throughout practically the entire surface without the occurrence of open spaces by the pressure of the atmosphere without welding of the surface of said metal sheet to the surface of said base plate, and sealing the said tube.

3. The method of producing articles of manufacture including table tops constituted of a thin metal sheet and a rigid, non-porous base plate which comprises superimposing a thin metal sheet upon a rigid, non-porous metal base plate provided with an exhausting port, deforming said superimposed metal sheet and base plate into the shape desired in the finished article of manufacture, sealing said metal sheet and plate solely in the neighborhood of the peripheral region thereof, exhausting the air in the space between the underside of the metal sheet and the upperside of the base plate whereby the metal sheet is forced into permanent intimate mechanical engagement with said base plate throughout practically the entire surface without the occurrence of open spaces by the pressure of the atmosphere without welding of the surface of said metal sheet to the surface of said base plate, and sealing said exhausting port.

4. The method of producing articles of manufacture including table tops constituted of a thin metal sheet and a rigid, non-porous base plate which comprises superimposing a thin metal sheet upon a rigid, non-porous metal base plate provided with an exhausting port, forcing said superimposed metal sheet and base plate through a die to stretch the sheet tightly over the base plate, sealing said metal sheet and plate solely in the neighborhood of the peripheral region thereof, exhausting the air in the space between the underside of the metal sheet and the upperside of the base plate whereby the metal sheet is forced into permanent intimate mechanical engagement with said base plate throughout practically the entire surface without the occurrence of open spaces by the pressure of the atmosphere without welding of the surface of said metal sheet to the surface of said base plate, and sealing said exhausting port.

5. The method of producing articles of manufacture including table tops constituted of a thin resilient sheet of corrosion resistant metal or alloy and a rigid steel base plate which comprises superimposing a thin metal sheet upon a rigid steel base plate provided with an exhausting port, sealing said metal sheet and plate solely in the neighborhood of the peripheral region thereof, exhausting the air in the space between the underside of the metal sheet and the upperside of the base plate whereby the metal sheet is forced into permanent intimate mechanical engagement with said base plate throughout practically the entire surface without the occurrence of open spaces by the pressure of the atmosphere without welding of the surface of said metal sheet to the surface of said base plate, and sealing said exhausting port.

6. The method of producing articles of manufacture including table tops constituted of a thin resilient sheet of corrosion resistant metal or alloy and a rigid steel base plate which comprises superimposing a thin metal sheet upon a rigid steel base plate provided with an exhausting port, providing said exhausting port with a tube, sealing said metal sheet and plate solely in the neighborhood of the peripheral region thereof, exhausting the air in the space between the underside of the metal sheet and the upperside of the base plate whereby the metal sheet is forced into permanent intimate mechanical engagement with said base plate throughout practically the entire surface without the occurrence of open spaces by the pressure of the atmosphere without welding of the surface of said metal sheet to the surface of said base plate, and sealing the said tube.

7. The method of producing articles of manufacture including table tops constituted of a thin resilient sheet of corrosion resistant metal or alloy and a rigid steel base plate which comprises superimposing a thin metal sheet upon a rigid steel base plate provided with an exhausting port, deforming said superimposed metal sheet and base plate into the shape desired in the finished article of manufacture, sealing said metal sheet and plate solely in the neighborhood of the peripheral region thereof, exhausting the air in the space between the underside of the metal sheet and the upperside of the base plate whereby the metal sheet is forced into permanent intimate mechanical engagement with said base plate throughout practically the entire surface without the occurrence of open spaces by the pressure of the atmosphere without welding of the surface of said metal sheet to the surface of said base plate, and sealing said exhausting port.

8. The method of producing articles of manufacture including table tops constituted of a thin resilient sheet of corrosion resistant metal or alloy and a rigid steel base plate which comprises superimposing a thin metal sheet upon a rigid steel base plate provided with an exhausting port, forcing said superimposed metal sheet and base plate solely through a die to stretch the sheet tightly over the base plate, sealing said metal sheet and plate in the neighborhood of the peripheral region thereof, exhausting the air in the space between the underside of the metal sheet and the upperside of the base plate whereby the metal sheet is forced into permanent intimate mechanical engagement with said base plate throughout practically the entire surface without the occurrence of open spaces by the pressure of the atmosphere without welding of the surface of said metal sheet to the surface of said base plate, and sealing said exhausting port.

V. GERSTENBERG.